Patented June 9, 1936

2,043,960

UNITED STATES PATENT OFFICE

2,043,960

ELECTRIC WELDING

Lloyd Theodore Jones, Harry Edward Kennedy, and Maynard Arthur Rotermund, Berkeley, Calif., assignors, by mesne assignments, to Union Carbide and Carbon Corporation, a corporation of New York No Drawing. Application October 9, 1925, Serial No. 44,142

29 Claims. (Cl. 219—10)

This invention relates to electric welding.

Among the various ways in which electrical energy has been converted into heat for the welding of metals, the arc process (which itself takes several forms) is the one most generally practiced. A typical example of arc-welding is its use to join the abutting edges of steel plates. In the metal-arc variation of the arc process, molten metal, provided by the melting of a metal wire or rod of suitable composition, is introduced between the abutting edges of the plates, and the latter are fused sufficiently to permit the added metal to coalesce with the metal of the plates so that, on cooling, a structurally strong bond results. The requisite heat is developed, as the term "arc process" implies, by maintaining either a direct current or an alternating arc between the parts to be welded, connected to one side of the power line, and the wire or rod used to supply the molten metal, connected to the other side of the power line. The abutting plate edges are usually beveled to form a trough for receiving the molten metal, thereby facilitating coalescence of the added metal with the plates throughout the thickness of the latter.

The simplicity of bare wire-electrode welding recommends it above all other methods, but the metallurgical and physical properties of metal deposited in this simple manner are usually so poor that the method is unsuitable for many applications.

In order to avoid certain difficulties encountered in bare metal arc welding, it is customary to protect the freshly deposited molten metal with a blanket of molten metal compounds (usually compounds of the alkali or alkaline earth metals). The material used for forming this blanket is called the "flux". The usual method of providing a flux blanket on the weld is to encase the welding rod or wire (usually referred to as the electrode) in an adherent sheath of solid flux, and this gives rise to other difficulties. The sheath is usually fragile and, being nonmetallic in nature, is nonconductive when cold, so that electrical connection must be made with the electrode at points bared for that purpose at intervals at variable distances from the weld, thereby imposing an additional burden on the automatic regulating devices widely used in welding. When the bared sections reach the melting zone metal of inferior quality is deposited. The current must pass through a variable length of rod, the length between the arc and the contact point, heating it sufficiently to crack off the flux covering and further to add an IR-drop to the arc voltage. This IR-drop is not constant in magnitude but varies according to the position of the contact point relative to the arc. The machine, unable to discriminate between arc voltage and electrode drop, cannot maintain the constant arc length so necessary to successful welding unless compensatory means are resorted to. These difficulties therefore limit the energy which may be expended in the arc. We are not aware of current values in excess of about 500 amperes being used in this manner of welding.

For good welding a homogeneous deposit of metal is indispensable. In metal-arc welding it is found that the difficulties involved in securing a homogeneous deposit are multiplied as the thickness of the deposit increases, so that, if thick plates are to be welded, it becomes necessary to make several traverses or "passes", adding a layer of metal each time until the necessary thickness is attained. This method of operation is obviously time-consuming, the more so since it is usually necessary to chip off the cover of solidified flux on one deposit, and peen the metal, before another deposit can be superimposed. It also complicates the stresses set up by contraction of the metal in the cooling weld, and the resulting distortion of the welded parts.

There is another known means of applying protective flux. It consists in utilizing a thick coating of finely divided material, a flux, which covers the seam to be welded. The welding electrode, which is a bare wire of suitable composition, is fed down by conventional feeding means and the arc is struck under this powdered flux. The electrode is traversed at a contant rate along the path to be welded. Direct current is applied at a voltage of about 30 volts with a current up to about 900 amperes. The flux used in this system has been a natural clay of approximately the composition used in making brick. The following is a typical analysis of such a flux: 50.6% $SiO_2$; 18.86% $Al_2O_3$; 4.34% $Fe_2O_3$; 5.00% $CaO$; 6.00% $Mn$; 3.03% $Fe$. Although this method retains the advantage of feeding current continuously to a bare wire at a point adjacent to the weld, the weld metal deposited thereby is seriously deficient in quality. A weld made by this method may have ample strength for certain purposes, but it is so porous that it can hardly be said to be satisfactory. It is, therefore, customary to hand-weld on the bottom side to insure superficial freedom from holes. It has not been found possible to extend this method beyond ½ inch plate and there is no immunity from undesirable porosity in any thickness. Moreover, the vigor of the arc submerged under this flux projects a continuous cloud of material into the atmosphere. An evidence of the amount of gas that is emitted by a flux of this nature is afforded by the fact that the welders very frequently wear gas masks to protect themselves from the dust. Since the dust is thrown up by gas that is evolved from the flux and the weld metal, it is not surprising that gas holes should be found in the metal of the weld.

An object of the present invention is to avoid the disadvantageous features cited above, and to provide a process by which even thick plates can be strongly and rapidly electrically welded, in a single pass or in a plurality of passes, with a weld of which the density and physical properties are at least equal to those of the parent metal. Another object is to provide a process in which heavier welding currents can be used and the rate of welding accelerated. A further object is to overcome the difficulties which, in prior processes, are caused by the inherent instability of an electric arc, its liability to be extinguished by a variety of adventitious causes, and the difficulty, especially in automatic machines, of reestablishing the arc when it has been extinguished. Another object is to avoid the necessity for a flux sheath on the electrode. Other objects of the invention will become apparent as the description of our invention proceeds.

We have discovered a novel process for electric welding wherein the necessary heat is generated by the passage of a heavy electric current between a metal electrode (usually bare) and the metal plates or similar objects to be welded, the electrode being out of mechanical contact with the objects and the current being carried across the gap between the electrode and the objects by and through a conductive melt or welding composition having appropriate electrical resistance properties. The heat thus generated melts successive portions of the electrode and the molten material is deposited as weld filler material. The welding composition serves as an active instrumentality, or welding medium, inasmuch as it provides heating means, controls the rate, penetration, and quality of welding, purifies the molten metal, and protects the molten metal.

A large number of experimental welds which we have made support the conclusion that the properties of a successful welding composition for this method of welding are these:

(1) The chemical reactions between the components of the welding composition must be completed before it is used in welding. Failure in this regard most surely invites porosity.

(2) It must be capable of controlling the penetration and the width of the weld.

(3) Its fluidity at welding temperatures must be such that it will not become entrained with the molten metal.

(4) It must consist of chemicals which are not detrimental to the properties of the steel, and (5) It must be readily removable from the finished weld.

The composition of the welding medium is of the utmost importance. The particular composition that is to be used is determined by the quality and thickness of the metal plates to be welded, by the current and voltage to be used, and by the properties it is desired to impart to the weld metal.

We have used calcium silicate and silicates of sodium, barium, iron, manganese, cobalt, magnesium, nickel and aluminum, both in binary and ternary combinations, in various proportions. We have also used calcium titanate and various titano-silicates, these being used when it is desired to introduce titanium into the weld metal. While a number of these conductive welding compositions are more or less efficacious in our process, we prefer to use silicates of the alkaline earth metals, such as calcium silicate, and we also prefer to add to these silicates minor proportions of alumina and of a substance adapted to lower the melting point, for example, a halide salt.

More specifically, the welding composition preferably comprises, as its principal ingredients, silica ($SiO_2$), at least one basic constituent consisting of an alkaline earth such as lime (CaO) or magnesia (MgO) or a mixture thereof, and alumina ($Al_2O_3$). The silica and basic constituent are in approximately the proportions theoretically required to form metasilicates, although a substantial excess of silica is permissible and frequently advisable. For example, if the basic constituent is lime, the proportions by weight will be approximately 0.7 to 1 part of CaO to 1 part of $SiO_2$; and if magnesia is substituted for part or all of the lime, the silica is increased accordingly, so as to maintain about the same stoichiometric proportions. The alumina forms about 1% to 8%, by weight, of the welding composition, and preferably about 4% to 6%. In order to cause the energy to be distributed over a larger area we add, in various minor proportions, say 6%, a material capable of reducing the energy concentration and thereby widening the weld. A preferred material for this purpose is a halide salt such as calcium fluoride.

The basic constituent preferably consists chiefly of lime and magnesia in approximately the proportions of three parts of CaO to one part of MgO, by weight; but other proportions are useful and within the invention. Basic materials other than lime or magnesia, for example oxides of manganese, titanium, or the alkali metals, and known fluxing agents such as borax or boric acid, may be added in moderate amounts without greatly changing the essential characteristics of the welding composition, but it is important that the composition be substantially free from iron oxides uncombined with other ingredients of the composition (by being prefused with such ingredients, for instance), and from materials (such as carbonates or moisture) which evolve detrimental amounts of gas or vapor at welding temperatures.

It is possible, and may at times be desirable, to include in the welding composition materials which are transferred to the weld filler material during the welding operation and appear in and modify the properties of the completed weld, for example: ferromanganese, ferrosilicon, ferrochromium, calcium molybdate, carbon, or reducible chemical compounds thereof.

In a specific instance, we fused together 50 pounds of calcium carbonate, 9.4 pounds of magnesium oxide, and 40.5 pounds of silica until the reaction was complete. The materials used were of the purest quality used in the ceramic industries, but the fused product showed the presence, on analysis, of about 5% alumina. The fused material was cooled and granulated, and to each pound, one ounce of fluorspar was added. The material was then ready for use to form the conductive melt which is the principal feature of our process.

Welding compositions which have been used successfully and which serve as representative examples within the invention have the following analyses, by weight:

|  | I | II | III | IV |
|---|---|---|---|---|
| Percent CaO | 29.5 | 31.24 | 29.18 | 40.12 |
| Percent MgO | 8.7 | 11.01 | 8.26 | 0.89 |
| Percent $SiO_2$ | 56.4 | 52.40 | 57.45 | 52.94 |
| Percent $Al_2O_3$ | 5.4 | 4.11 | 4.86 | 5.80 |
| Percent $Fe_2O_3$ | Low | 0.13 | 0.24 | 0.23 |

Before use, about 1 part of calcium fluoride was added to 16 parts, by weight, of each of the above compositions.

The chemical condition of the welding composition or medium is important: the acidic and basic constituents should be reacted, the composition should be substantially anhydrous and free from gases, and all reactions which would evolve deleterious amounts of gases during welding should be substantially completed, before the medium is used in the welding process. These conditions are suitably attained by prefusing a mixture of the constituents, preferably in an electric furnace. Certain relatively volatile but chemically stable constituents such as calcium fluoride may be added to the medium either before or after the other ingredients have been fused and cooled. The carbonates of calcium or magnesium may be substituted for the oxides, of course, if the ingredients are prefused.

The physical condition of the welding composition is likewise of the utmost importance. If the molten medium is rapidly solidified by cooling, before grinding and use, more homogeneous and solid welds may be produced than when it slowly loses heat and solidifies. The fused composition is preferably cast as a relatively thin layer against efficient cooling or chilling means such as a cold heavy plate or block of metal, or a water-cooled chill plate, rather than as a large ingot. It is preferred that the rate of cooling be such that substantially all of the solidified welding composition is characterized by a vitreous fracture.

In practicing our process the plates to be welded are arranged as for metal open arc welding. The edges are preferably beveled, but this is less necessary than with arc welding because the "penetration" and width of the weld (the extent to which the edges of the plates are fused during the welding) is dictated by the composition of the flux and the voltage and current employed, and can be closely controlled in our process. Means for "backing-up" the seam during welding is preferably used.

When a weld is to be made between beveled edges the operation is started by filling the groove, space, or gap between the edges of the objects with the welding composition, preferably in powdered or granular form, and a substantial additional quantity of the composition is heaped up along the groove, thereby overfilling the said groove. After the weld is completed, that portion of the composition which has not been fused may be removed, by a vacuum system for example, collected and reused. The portion which has been fused may be lifted from the weld, exposing a clean and uniform weld surface. The fused material may be reground and reused, any volatile constituents, such as halides, being replaced. However, under some circumstances the reuse of the welding composition results in a somewhat inferior weld, probably because the composition has picked up impurities during its use.

According to the welding method of the invention, the end of the welding electrode, which is preferably a bare metal electrode, is first inserted into the welding composition. Since the composition is nonconductive when cold, a conductive path for the welding current is provided by bridging the gap between the electrode and the work with, for example, a sliver of graphite or a wad of steel wool. The power is then applied, the welding composition is locally heated until it fuses and becomes conductive, forming a subsurface pool, and immediately thereafter the end of the electrode begins to fuse and the molten metal begins to deposit in the groove, displacing the subsurface pool of fused welding composition. At the same time the edges of the objects being welded begin to fuse and to coalesce with the deposited metal. The electrode is then fed toward the work and moved along the seam at an appropriate rate, preferably by a mechanical device which may be similar to those which are extensively used in open arc welding, and the welding proceeds without interruption.

The welding proceeds under a protective layer of the composition unobtrusively. There is practically no puffing or visible displacement of the welding medium, no visible sparking, and, indeed, scarcely any external evidence that a weld is being made. The weld is ordinarily completed in one pass, even in thick plate. The welding composition in front of the electrode remains unfused, while the fused composition rises to the top of the completed portion of the weld and solidifies. Even this effect is scarcely visible because of the use of an excess of the welding composition which remains unfused and covers the fused composition and metal.

It is possible in our process to use either alternating or direct current, or direct current superimposed on alternating current. Alternating current alone is preferred.

The results attained are influenced, as in open arc welding, by the potential or voltage difference between the electrode and the work, by the magnitude of the welding current, by the size of the electrode, and by the rates at which the electrode is fed toward the seam and traversed along the seam. Assuming a constant welding speed, the welding voltage and current vary with the plate thickness, each being a function thereof. For example, we may use a welding voltage of about 36 volts and a welding current of about 1500 amperes when welding together steel plates about one inch thick using a bare welding rod about ⅜ inch in diameter and a welding speed along the seam of about 8 inches per minute. The welding current may rise to 2000 amperes or more, and with such heavy currents plates 1.5 to 2 inches thick may be welded in one pass at a rate of 6 or 7 inches per minute.

The preferred welding current is a function of several factors including the diameter of the electrode, the rates of penetration, deposition of metal, and travel along the seam, the penetration of the work piece, and the composition of the flux. It is a characteristic of the invention that, for an electrode of a given size, the preferred current is far greater than can be used successfully in processes heretofore known. The following table indicates the order of magnitude of the current in the old and new processes, for the purposes of comparison, but it will be realized that the invention is not limited to the use of the current values shown.

| Electrode diameter inches | Current amperes | |
|---|---|---|
| | The invention | Old methods |
| ³⁄₁₆ | 500 to 800 | 170 to 210 |
| ¼ | 800 to 1200 | 225 to 300 |
| ⁵⁄₁₆ | 1250 to 1700 | 300 to 400 |
| ⅜ | 1500 to 2200 | 375 to 525 |

In welding very heavy plate it is sometimes advantageous to use two passes rather than only one, because of mechanical difficulties in supplying large amounts of filler metal rapidly. The facts that the weld has little or no internal stress, and that the flux lifts off easily, leaving a clean surface, expedite the two-pass method.

Welds made by our process have certain distinguishing characteristics. A cross section of our weld shows, in most cases, that the planes defining the ultimate zone of fusion at the sides of the weld are approximately parallel. This relation is almost independent of the character of the V and obtains whether the parts are preliminarily beveled to a wide V, to a narrow V, or are not beveled at all. The deposit of metal occurs, not directly under the electrode, but back of it, and there appear to be liquid currents (possibly caused by the so-called "pinch effect") which cause the surface of the resistive composition to be depressed at the point where it is first fused, that is, just behind the electrode, and cause both the deposited metal and the conductive melt to be heaped up back of the electrode. This facilitates the production of a weld having the desirable upwardly convex surface, with some excess metal above the seam, which can either be machined off, or, as in the usual practice, left for reinforcement. The relatively high current densities which are preferably used superheat the molten metal and welding composition, making them highly fluid. The liquid currents set up in this highly fluid mass effectively mix the metal and welding composition, thereby cleansing or washing impurities out of the metal, and then completely separate the metal as it is deposited. As a result, unusually clean and strong metal is deposited. Since the amount of metal solidifying is uniformly wide, unequal stresses, which would tend to warp the plate, are not created, and the weld is of such low internal stress that no evidence of plate deflection is apparent after its completion.

Several circumstances show clearly that our process does not depend on the formation of an arc of the usual type. If, while a weld is being made, the circuit is opened externally of the weld and then closed again while the resistive composition is still molten, the current will immediately resume its flow without any necessity for moving the electrode into contact with the seam as it would be necessary to do to reestablish an arc of the usual type. The heat for melting the electrode is evidently developed in the conductive melt itself.

The conductive welding composition used in our process doubtless performs the protective functions of a flux, but it is much more than a flux, and many compositions which are satisfactory fluxes for arc welding are unsuitable for our purpose. When an electric current is passed through a material which becomes a Nernst conductor at a low temperature a relatively large area of the material will be engaged in the conduction. Common salt (NaCl) is a material of this class: if it is used, the current is conducted from the electrode to the plate almost entirely by the fused electrolyte. So much salt is involved in the conduction that the energy density is insufficient to produce fusion of the plate or wire. If, on the other hand, a material becomes a Nernst conductor at an exceedingly high temperature, very little of the material is involved in the conduction, the energy is thereby so concentrated as to melt very deeply and with very small cross section. By a proper selection of welding composition, as explained hereinabove, the energy density on the parts to be welded may be satisfactorily controlled and the production of a sound weld may be assured.

This application is a continuation, in part, of our prior applications Serial Numbers 657,836 and 705,892, respectively, filed February 21, 1933 and January 9, 1934.

We claim:

1. The process of electric welding which comprises the steps of juxtaposing an electrode and a conductive member on which metal is to be deposited; establishing between said member and said electrode a conductive path of a high-resistance melt of chemically stable fusible material having at welding temperatures substantially the fluidity and electrical conductivity of a fusible silicate, and substantially free from substances capable of evolving large amounts of gases during welding; passing through said melt an electric current of sufficient strength to maintain its conductivity, progressively melt the required amount of metal, and cause the resulting molten metal to coalesce with said member; and maintaining said melt in contact with said electrode throughout the welding operation to avoid the formation of a substantial air-conducted electric arc between the electrode and the said conductive member.

2. The method of electric welding by melting a metal electrode, depositing the metal so melted upon a metal work piece, and coalescing said melted metal with adjacent fused metal of said work piece, which method comprises supplying heat for said welding by passing an electric current, at a density of upwards of about 2000 amperes per inch of diameter of said electrode, substantially wholly through a pool of silicate fused in situ, without the formation of any substantial gas-conducted electric arc.

3. The method of electric welding by melting a metal electrode, depositing the metal so melted upon a metal work piece, and coalescing said melted metal with adjacent fused metal of said work piece, which method comprises supplying heat for said welding by passing an electric current from said electrode to said work piece through a fused nonmetallic material which acts as a high-resistance conductor at welding temperatures and which does not evolve substantial amounts of gas when in contact with the melted weld metal, and maintaining said material in constant contact with said electrode and work piece to avoid the formation of a substantial air-conducted electric arc between the electrode and work piece.

4. The method of electric welding by melting a metal electrode, depositing the metal so melted upon a metal work piece, and coalescing said melted metal with adjacent fused metal of said work piece, which method comprises supplying heat for said welding by passing an electric current from said electrode to said work piece through a pool of nonmetallic material fused in situ without material evolution of gas, and maintaining said pool in constant electrical contact with said electrode and work piece to avoid the formation of a substantial air-conducted electric arc between the electrode and work piece; said non-metallic material being one which acts as a high-resistance conductor at welding temperatures.

5. The process of electric welding which comprises the steps of juxtaposing a metal electrode and a conductive member on which metal is to be deposited; establishing between said member and said electrode a conductive path of a high-resistance melt of fusible silicate, substantially free from substances, such as uncombined iron oxide, capable of evolving large amounts of gases when fused in contact with the metal to be deposited; passing through said melt an electric current of sufficient magnitude to maintain the conductivity, progressively melt the said electrode and cause the resulting molten metal to coalesce with said member; and maintaining said melt in contact with said electrode and member throughout the welding operation.

6. The process of electric welding which comprises the steps of juxtaposing a metal electrode and a conductive member on which metal is to be deposited; establishing between said member and said electrode a conductive melt comprising an alkaline earth metal silicate, alumina, and an alkaline earth metal fluoride, substantially free from substances, such as uncombined iron oxide, capable of evolving gases when fused in contact with the metal to be welded; passing through said melt an electric current of sufficient magnitude to maintain the conductivity, progressively melt the said electrode and cause the resulting molten metal to coalesce with said member; and maintaining said melt in contact with said electrode and member throughout the welding operation.

7. The process of electric welding which comprises juxtaposing a metal electrode and a metal member on which metal is to be deposited from said electrode; filling the gap between said electrode and said member with a finely-divided, unbonded, nonmetallic material which is fusible at welding temperatures; heaping an additional amount of said material above said gap so as to submerge said electrode for a substantial distance; fusing a portion of said material in said gap to render the material electrically conductive; progressively moving said electrode along said member; passing through the circuit comprising said electrode, fused material, and work piece an electric current sufficient to melt successive portions of said electrode and said metal member and to maintain a pool of said nonmetallic material in contact with said electrode and adjacent to and covering the molten metal; and simultaneously maintaining said fused pool, said end of said electrode, and said molten metal submerged under a quiet layer of said nonmetallic material.

8. The method of uniting metal work pieces by fusion depositing added metal from an electrode and coalescing such added metal with adjacent fused metal of the work which comprises juxtaposing the work pieces to be united so that a space is provided therebetween at the line of intended union, overfilling said space with unbonded particles of a prefused solidified and ground material capable of refusion in situ and active when fused to cleanse the fused depositing metal of an electrode, such refusion and cleaning occurring without substantial apparent gas evolution, and traversing said space with the end of an electrode of the metal to be deposited, said end being submerged in said material, while passing current between the work and the electrode of a magnitude to maintain a localized subsurface pool of said material fused and to fuse the electrode at a rate to effect deposit of sufficient metal therefrom to displace said pool and substantially fill said space as traversed, and maintaining a substantially quiet surface layer of said unbonded particles over the area of fusion.

9. The method of uniting metal work pieces by fusion depositing added metal from an electrode and coalescing such added metal with adjacent fused metal of the work, which comprises juxtaposing the work pieces to be united so that a space is provided therebetween at the line of intended union, traversing said space with an electrode of the metal to be deposited while passing an electric current between the work and the electrode of a magnitude to fuse the latter at a rate to effect deposit of sufficient metal therefrom to substantially fill said space as traversed, bridging the fusing end of said electrode and the adjacent fused local area of the work with a pool of material fused in situ without substantial gas evolution, said fused material being electrically conductive and active to cleanse the fused metal of the electrode and the work, and simultaneously maintaining said fused pool, said end of said electrode and said local area of the work submerged under a quiet protective layer of unbonded particles.

10. A process of electric welding which comprises the steps of juxtaposing a metal electrode and a conductive object on which metal is to be deposited, placing between said object and said electrode a high resistance conductive path consisting of a prefused welding composition, and passing through said electrode, welding composition, and object an electric current of sufficient magnitude to establish and to maintain the conductivity of said composition, to melt successive portions of said electrode, and to cause the resulting molten metal to coalesce with said object; said welding composition being substantially free from uncombined iron oxide and from materials which evolve gas at welding temperatures and having for its principal ingredients silica, lime, magnesia, and alumina, and also containing a minor proportion of a halide salt, the silica, lime and magnesia being in approximately the proportions of 27 to 38 parts lime, 9 to 16 parts magnesia, and 60 parts silica, and the alumina being about 4% to 6% of the composition.

11. A process of electric welding which comprises the step of forming a conductive high-resistance melt, containing a major proportion of alkaline earth metal silicate and substantially free from uncombined iron oxide, on a metal part to be fused; and passing an electric current through a circuit comprising said melt and said metal part.

12. A process of electric welding which comprises the steps of juxtaposing a metal electrode and a conductive member on which metal is to be deposited; establishing between and in contact with said member and said electrode a conductive melt of fusible silicate, substantially free from substances capable of evolving gases when fused in contact with the metal to be deposited; and passing through said melt an electric current of sufficient magnitude to maintain the conductivity, progressively melt the said electrode and cause the resulting molten metal to coalesce with said member.

13. A process of electric welding which comprises the steps of juxtaposing a metal electrode and a conductive member on which metal is to be deposited; establishing between and in contact with said member and said electrode a conductive path of high-resistance melt containing a major proportion of alkaline earth metal silicate and substantially free from uncombined iron oxide; and passing along said conductive path an electric current of sufficient magnitude to maintain the conductivity, progressively melt the said electrode and cause the resulting molten metal to coalesce with said member.

14. A process of electric welding which comprises the steps of juxtaposing a metal electrode and a conductive member on which metal is to be deposited; establishing between and in contact with said member and said electrode a conductive melt comprising an alkaline earth metal silicate and an alkaline earth metal fluoride; and passing through said melt an electric current of sufficient magnitude to maintain the conductivity, progressively melt the said electrode and cause the resulting molten metal to coalesce with said member.

15. A process of electric welding which comprises the steps of juxtaposing a metal electrode and a conductive member on which metal is to be deposited; establishing between and in contact with said member and said electrode a conductive melt containing a major proportion of alkaline earth metal silicate and substantially free from uncombined iron oxide; passing electric current through said melt to maintain the conductivity and progressively melt said electrode; and moving said electrode along said member while maintaining the current and the conductive melt therebetween.

16. A process of electric welding which comprises the steps of juxtaposing a metal electrode and a conductive member on which metal is to be deposited; establishing between and in contact with said member and said electrode a conductive melt of fusible silicate substantially free from uncombined iron oxide; and passing through said melt an electric current of sufficient magnitude to maintain the conductivity, progressively melt the said electrode and cause the resulting molten metal to coalesce with said member.

17. A process of electric welding which comprises the steps of juxtaposing a metal electrode and a conductive member on which metal is to be deposited; establishing between and in contact with said member and said electrode a conductive melt of an alkaline earth metal silicate substantially free from uncombined iron oxide; and passing through said melt an electric current of sufficient magnitude to maintain the conductivity, progressively melt the said electrode and cause the resulting molten metal to coalesce with said member.

18. A composition for electric welding containing a major proportion of alkaline earth metal silicate, and being substantially free from uncombined iron oxide and from substances capable of evolving gases under welding conditions.

19. A composition for electric welding containing a major proportion of calcium silicate, and being substantially free from uncombined iron oxide and from substances capable of evolving gases under welding conditions.

20. A composition for electric welding containing a fluoride and a major proportion of alkaline earth metal silicate, and being substantially free from uncombined iron oxide and from substances capable of evolving gases under welding conditions.

21. A composition for electric welding containing a fluoride and a major proportion of calcium silicate and being substantially free from uncombined iron oxide and from substances capable of evolving gases under welding conditions.

22. A finely-divided unbonded fusible electric welding composition containing a fluoride and a major proportion of an alkaline earth metal silicate.

23. A finely-divided unbonded fusible composition for use in electric welding employing a bare metal electrode as a source of weld metal, said composition being substantially free from substances capable of evolving a detrimental quantity of gas under welding conditions and containing calcium fluoride and a major proportion of one or more alkaline earth metal silicates.

24. A fluxing material for electric welding comprising metallic silicate and calcium fluoride.

25. A composition for electric welding comprising fluorspar, magnesium silicate, and calcium silicate, the latter silicate being present in predominant proportion.

26. An electric welding composition which is conductive when molten, consists chiefly of silicates, and contains about 1% to 8% alumina.

27. A prefused electric welding composition which is conductive when molten and the principal constituents of which are alkaline earth metal silicates, said composition containing about 1% to 8% alumina and being substantially free from materials such as uncombined iron oxide which evolve large volumes of gas or vapor at welding temperatures.

28. A prefused electric welding composition which is conductive when molten, is substantially free from uncombined iron oxide and from materials which evolve large amounts of gas at welding temperatures, and the principal ingredients of which are silica, alumina, and at least one basic ingredient of the group consisting of lime and magnesia, the basic ingredients being present in an amount between about 70% and about 100% of that theoretically required to combine with all of the silica present to form metasilicates, and the alumina being about 2% to 8% of the composition; and said composition having as a minor ingredient an alkaline earth metal fluoride.

29. A prefused and comminuted electric welding composition which has a vitreous fracture, is conductive when molten, and consists substantially of silica, lime, magnesia, alumina, and calcium fluoride, the silica, lime, and magnesia being in approximately the proportions of 27 to 38 parts lime, 9 to 16 parts magnesia, and 60 parts silica, the alumina being about 4% to 6% and the calcium fluoride being about 6% of the composition; said composition being substantially free from uncombined iron oxide and from materials which evolve gas or vapor at welding temperatures.

LLOYD THEODORE JONES.
HARRY EDWARD KENNEDY.
MAYNARD ARTHUR ROTERMUND.

Disclaimer 2,043,960.—*Lloyd Theodore Jones, Harry Edward Kennedy* and *Maynard Arthur Rotermund*, Berkeley, Calif. ELECTRIC WELDING. Patent dated June 9, 1936. Disclaimer filed Mar. 15, 1949, by the assignee, *The Linde Air Products Company*.

Hereby enters this disclaimer to claims 1 to 17 inclusive, and claims 24, 26, 27, 28, and 29 of said specification.

[*Official Gazette April 19, 1949.*]